(12) United States Patent
Larsson (10) Patent No.: US 9,191,818 B2
(45) Date of Patent: Nov. 17, 2015

(54) METHODS AND DEVICES FOR OTA MANAGEMENT OF SUBSCRIBER IDENTITY MODULES

(75) Inventor: Thomas Larsson, Alvsjo (SE)

(73) Assignee: GIESECKE & DEVRIENT GMBH, Munich (DE)

( * ) Notice: Subject to any disclaimer, the term of this patent is extended or adjusted under 35 U.S.C. 154(b) by 156 days.

(21) Appl. No.: 14/125,014

(22) PCT Filed: Apr. 23, 2012

(86) PCT No.: PCT/EP2012/001740
§ 371 (c)(1),
(2), (4) Date: Dec. 9, 2013

(87) PCT Pub. No.: WO2012/167856
PCT Pub. Date: Dec. 13, 2012

(65) Prior Publication Data
US 2014/0098957 A1 Apr. 10, 2014

(30) Foreign Application Priority Data

Jun. 8, 2011 (EP) .................................. 11004668

(51) Int. Cl.
*H04W 12/06* (2009.01)
*H04L 29/06* (2006.01)
(Continued)

(52) U.S. Cl.
CPC ............. *H04W 12/06* (2013.01); *H04L 9/3271* (2013.01); *H04L 63/08* (2013.01); *H04W 8/245* (2013.01); *H04L 2209/80* (2013.01)

(58) Field of Classification Search
None
See application file for complete search history.

(56) References Cited

U.S. PATENT DOCUMENTS

| 8,064,597 B2 | 11/2011 | Gehrmann |
| 2005/0228992 A1* | 10/2005 | Mizikovsky .................. 713/168 |
| 2006/0205434 A1* | 9/2006 | Tom et al. ..................... 455/558 |

(Continued)

FOREIGN PATENT DOCUMENTS

| CN | 101690287 A | 3/2010 |
| WO | 2010093312 A1 | 8/2010 |

OTHER PUBLICATIONS

Ericsson, "Architecture Modifications and Alternatives for Remote Management of USIM Application on M2M Equipment," 3GPP TSG SA WG3 Security-S3#50, Feb. 25-29, 2008, pp. 1-6.

(Continued)

*Primary Examiner* — Venkat Perungavoor
*Assistant Examiner* — Christopher Ruprecht
(74) *Attorney, Agent, or Firm* — Workman Nydegger (57) ABSTRACT

Methods and devices in a mobile communications system for over the air management of mobile stations contain a secure identification element such as a subscriber identity module. A standard challenge-response authentication procedure is implemented in a mobile communications system not for its intended authentication purpose, but for providing a mobile station with subscription data. The standard challenge-response authentication procedure is modified in that the challenge is used as a carrier for subscription data. The challenge containing the subscription data is provided to the mobile station in response to a request of the mobile station to be allowed access or attachment to the mobile communications system containing a special mode indicator data element, which indicates to the mobile communications system that the mobile station is requesting subscription data and suitably forwarded to a data providing unit configured to provide subscription data.

15 Claims, 4 Drawing Sheets

(51) Int. Cl.
*H04L 9/32* (2006.01)
*H04W 8/24* (2009.01)

(56) References Cited

U.S. PATENT DOCUMENTS

| | | |
|---|---|---|
| 2009/0077643 A1* | 3/2009 | Schmidt et al. ............... 726/6 |
| 2009/0125996 A1* | 5/2009 | Guccione et al. ............... 726/6 |
| 2009/0205028 A1* | 8/2009 | Smeets et al. ............... 726/6 |
| 2009/0217038 A1* | 8/2009 | Lehtovirta et al. ............... 713/168 |
| 2009/0217348 A1* | 8/2009 | Salmela et al. ............... 726/2 |
| 2009/0217364 A1* | 8/2009 | Salmela et al. ............... 726/6 |
| 2009/0253409 A1* | 10/2009 | Slavov et al. ............... 455/411 |
| 2010/0017603 A1* | 1/2010 | Jones ............... 713/168 |
| 2011/0136482 A1* | 6/2011 | Kaliner ............... 455/418 |
| 2011/0265158 A1* | 10/2011 | Cha et al. ............... 726/6 |
| 2012/0122423 A1* | 5/2012 | Helmreich ............... 455/411 |
| 2012/0173743 A1* | 7/2012 | Yu ............... 709/228 |
| 2013/0012168 A1* | 1/2013 | Rajadurai et al. ............... 455/411 |
| 2013/0189955 A1* | 7/2013 | Horn et al. ............... 455/411 |
| 2013/0227663 A1* | 8/2013 | Cadenas Gonzalez ............... 726/6 |
| 2013/0326603 A1* | 12/2013 | Kato et al. ............... 726/6 |

OTHER PUBLICATIONS

International Search Report for corresponding PCT Application No. PCT/EP2012/001740, mailed Jul. 10, 2012.

\* cited by examiner

METHODS AND DEVICES FOR OTA MANAGEMENT OF SUBSCRIBER IDENTITY MODULES

FIELD OF THE INVENTION

The invention relates to mobile communications in general and in particular to methods and devices for over the air management of mobile stations containing a secure identification element, preferably a subscriber identity module, in a mobile communications system.

BACKGROUND OF THE INVENTION

The Global System for Mobile Communications (GSM) is the world's most popular standard for mobile communications systems. The technical features of GSM are defined by a large number of interrelated and mutually dependent specifications published by the ETSI standardization organization. Generally, for communicating with a mobile station (also referred to as a mobile or cellular phone) via a public land mobile network (PLMN) implemented according to the GSM specifications requires a secure identification element called subscriber identity module (SIM), usually in the form of a smart card. The SIM contains subscription data for authenticating and identifying the subscriber of the PLMN, including in particular the International Mobile Security Identity (IMSI) and the authentication key Ki. This network-specific information is generally stored on the SIM by the PLMN operator or the SIM manufacturer during a SIM personalization process prior to providing the subscriber with his SIM. A nonpersonalized SIM is generally not suited for use in a mobile phone, i.e. the use of the services provided by a PLNM with a nonpersonalized SIM is not possible.

According to the GSM standard the IMSI stored on the SIM is a number with up to 15 digits that allows for an internationally unique identification of the subscriber. The first 3 digits of the IMSI number represent the Mobile Country Code (MCC), the next 2 or 3 digits represent the Mobile Network Code (MNC), and the remaining digits (up to 10) represent the mobile station identification number (MSIN) assigned by the PLMN operator. The IMSI number allows the operator of the PLMN to identify a subscriber and to provide the subscriber with those services he has subscribed to.

The authentication key Ki is a 128-bit data element for authenticating the SIM contained in a mobile phone with respect to the PLMN. The authentication key Ki is paired with a specific IMSI number during the SIM personalization process. For security reasons the authentication key Ki is only stored on the SIM and on a database of the PLMN called authentication center (AUC).

The GSM authentication procedure, described in the following, is an implementation of a general challenge-response authentication procedure, in which one party, i.e. the PLMN, presents a challenge and another party, i.e. the mobile phone, must provide a valid response to be authenticated. When a mobile phone starts up, it retrieves the IMSI number from its SIM. The user of the mobile phone generally has to enter a PIN before the SIM will grant access to the IMSI number. The mobile phone sends the IMSI number via the air interface and the base station subsystem (BSS) to the mobile switching center (MSC) of a PLMN. The MSC forwards the IMSI to the home location register (HLR) and requests authentication triplets. When the HLR receives the IMSI number and the request for authentication triplets, it first checks its database to make sure the IMSI number is valid and belongs to the network. Once it has accomplished this, it forwards the IMSI number and request for authentication triplets to the AUC. The AUC uses the IMSI to look up the authentication key Ki associated with that IMSI. The AUC will also generate a 128-bit random number called RAND, which together with the authentication key Ki is fed into the A3 encryption algorithm. The output of the A3 encryption algorithm is a 32-bit number called Signed Response (SRES).

The RAND number and the authentication key Ki are moreover fed into the A8 encryption algorithm. The output is a 64-bit number called Kc. The Kc is the ciphering key that is used in the A5 encryption algorithm to encipher and decipher the data that is being transmitted over the air interface between the mobile phone and the PLMN.

The RAND number, the SRES, and the ciphering key Kc form an authentication triplet that is unique to the IMSI number used for creating this triplet. Once the AUC has generated such an authentication triplet, it forwards it to the HLR, which, in turn, sends it to the requesting MSC. The MSC stores the ciphering key Kc and the SRES but forwards the RAND number as the challenge of the GSM challenge-response authentication procedure to the mobile station and requests authentication.

The authentication key Ki is securely stored on the SIM of the mobile phone. The A3 and A8 encryption algorithms also reside on the SIM. The RAND number received from the MSC via the air interface and the authentication key Ki are fed into the A3 and A8 encryption algorithms to generate another signed response SRES* and the ciphering key Kc, respectively. The mobile phone stores the ciphering key Kc on the SIM and sends the generated signed response SRES* as the response of the GSM challenge-response authentication procedure back to the mobile network. The MSC receives the signed response SRES* generated by the mobile phone and compares it with the signed response SRES generated by the AUC. If they match, the SIM of the mobile phone is authenticated.

It is known to manage SIMs or devices equipped with such SIMs over-the-air (OTA) using standardized protocols carried over SMS (short message service) or IP (Internet protocol) communication channels using an already established connection in a mobile communications system. WO 2010/093312, for instance, describes a method for OTA activation and management of a SIM using an ODA (On Demand Activation) application. The method described in WO 2010/093312 is adapted to activate and manage a SIM after it has authenticated itself relative to the PLMN according to the above described GSM challenge-response authentication procedure.

One particular field of application of SIMs which is expected to grow rapidly within the next couple of years is M2M, i.e. the communication between machines over a mobile communications network without human intervention, also called the Internet of things. In M2M data is automatically transmitted between many different types of machines equipped with a SIM, such as TV systems, set top boxes, vending machines, vehicles, electronic books, automatic cameras, sensor devices, and the like. It is foreseeable that at least for some of these devices it will not be possible or at least very difficult to provide the SIM beforehand with a complete subscription data set, for instance an IMSI number. This is because in some M2M applications the SIM can be a surface mounted device, which has to be embedded within the respective machine during the manufacturing process thereof without the possibility of providing the SIM with complete subscription data beforehand. Consequently, once in the field, these machines require the provision of subscription data over-the-air.

US 2009/0217038 discloses a method for a wireless device to obtain the IP address of a data server in a wireless network for downloading subscription data. The wireless device derives the data server address from an authentication challenge value send by the wireless network in response to the wireless device's authentication request. According to the method disclosed in US 2009/217038 any subscription data is downloaded from the data server defined by the address derived from the authentication challenge value or has to be present on the wireless device in the first place, such as the secret authentication key Ki.

The problem addressed by the present invention is to provide for methods and devices that allow providing a mobile phone including a secure identification element, such as a SIM, over-the-air with subscription data that allow even a mobile phone having practically no subscription data in the first place to attach to a PLMN.

SUMMARY OF THE INVENTION

This object is achieved according to the present invention by the subject-matter of the independent claims. Preferred embodiments are defined in the dependent claims.

Generally, the present invention is based on the idea to use the standard challenge-response authentication procedure implemented in a mobile communications system not for its intended authentication purpose, but for providing a mobile station over-the-air (OTA) with subscription data. The challenge-response authentication procedure is modified in that the challenge is used as an OTA carrier for subscription data. This challenge containing or carrying the subscription data is provided to the mobile station in response to a standard request of the mobile station to be allowed access or attachment to the mobile communications system using a mode indicator data element, which preferably indicates to the mobile communications system that the mobile station is requesting subscription data and, therefore, is suitably forwarded to a subscription data providing unit.

More specifically, according to a first aspect the invention is directed to a method for providing subscription data from a data providing unit to a mobile station comprising a secure identification element, preferably in the form of a subscriber identification module, for communication via a mobile communications system. The method comprises the following steps in the data providing unit: receiving a request from the mobile station to start a standard challenge-response authentication procedure implemented in the mobile communications system, wherein the request contains a mode indicator data element; creating a challenge containing subscription data, wherein the format of the challenge complies with the challenge-response authentication procedure implemented in the mobile communications system, and transmitting the challenge containing subscription data to the mobile station.

According to a second aspect of the invention a method is provided for obtaining subscription data from a data providing unit by a secure identification element, preferably a subscriber identification module, of a mobile station for communication via a mobile communications system. The method comprises the following steps in the secure identification element: providing a mode indicator data element to the mobile equipment of the mobile station, which issues the mode indicator data element as part of a request to start a challenge-response authentication procedure implemented in the mobile communications system; receiving a challenge carrying subscription data issued by the data providing unit, wherein the format of the challenge complies with the challenge-response authentication procedure implemented in the mobile communications system; and storing the subscription data.

According to a third aspect the invention is directed to a data providing unit for providing a mobile station comprising a secure identification element, preferably a subscriber identity module, with subscription data for communication via a mobile communications system. The data providing unit is configured to or comprises respective means to receive a request from the mobile station to start a challenge-response authentication procedure implemented in the mobile communications system containing a mode indicator data element, to create a challenge containing subscription data, wherein the format of the challenge complies with the challenge-response authentication procedure implemented in the mobile communications system, and to transmit the challenge containing subscription data to the mobile station.

According to a fourth aspect, the present invention provides for a secure identification element, preferably a subscriber identity module, for a mobile station for communication via a mobile communications system. The secure identification element is configured to or comprises respective means to provide a mode indicator data element to the mobile station, which issues the mode indicator data element as part of a request to start a challenge-response authentication procedure implemented in the mobile communications system, to receive a challenge carrying subscription data issued by a data providing unit, wherein the format of the challenge complies with the challenge-response authentication procedure implemented in the mobile communications system, and to store the subscription data.

According to a fifth aspect the present invention provides for a mobile communications system comprising a data providing unit configured to provide subscription data and a mobile station with a secure identification element, preferably a subscriber identity module, as described above.

According to preferred embodiments, the subscription data carried by the challenge allows the mobile station to authenticate itself with respect to the mobile communications system using the challenge-response authentication procedure implemented therein. Furthermore, the subscription data can comprise other data pertaining to the subscription of the mobile station and/or data containing instructions to perform certain actions, i.e. instruction data, such as "retry data retrieval in 60 seconds", "use a different data providing unit" or the like.

Preferably, the mode indicator data element causes the mobile communications system to forward the request of the mobile station to the data providing unit and informs the data providing unit that the mobile station (i.e. its secure identification element, preferably its subscriber identity module) is requesting subscription data. To this end, the mode indicator data element can define or contain the address of the data providing unit.

According to preferred embodiments, the subscription data retrieval procedure according to the present invention is performed before the mobile station has attached to the mobile communications system.

Preferably, the subscription data carried by the challenge is in plaintext, encrypted or a pointer to subscription data already pre-stored in the mobile station, such as in its secure identification element, preferably its subscriber identity module.

According to preferred embodiments, the subscription data retrieval procedure according to the present invention can be repeated more than once to provide the mobile station with subscription data having a size that is larger than the size of the challenge of the challenge-response authentication procedure implemented in the mobile communications system.

Preferably, the subscription data carried by the challenge depends upon the location of the mobile station and/or the type of the mobile station.

According to preferred embodiments, the mobile communications system is implemented according to the GSM standard. In such a preferred embodiment the challenge is created as a 128-bit RAND* number that carries the subscription data, preferably as part of an authentication triplet that further comprises a signed response SRES and a ciphering key Kc according to the GSM challenge-response authentication procedure.

Preferably, the mode indicator data element is a preliminary IMSI (PIMSI) number that preferably defines or contains the address of the data providing unit. According to preferred embodiments, the PIMSI number has the same format as an IMSI number.

In the preferred case that the mobile communications system is implemented according to the GSM standard, the subscription data carried by the challenge (RAND*) preferably comprises an IMSI number and/or an authentication key Ki.

The data providing unit can be a dedicated stand-alone unit, e.g. a subscription data providing server (also called OTA server), of the mobile communications system or implemented as part of a Home Location Register (HLR) of the mobile communications system that performs the functions of the data providing unit.

These and other features, characteristics, advantages, and objects of the invention will be clear from the following detailed description of preferred embodiments, given as a non-restrictive example, under reference to the attached drawings. The person skilled in the art will appreciate, in particular, that the above preferred embodiments can be combined in several ways, which will result in additional advantageous embodiments that are explicitly supported and covered by the present invention.

DETAILED DESCRIPTION OF PREFERRED EMBODIMENTS

Figure 1:
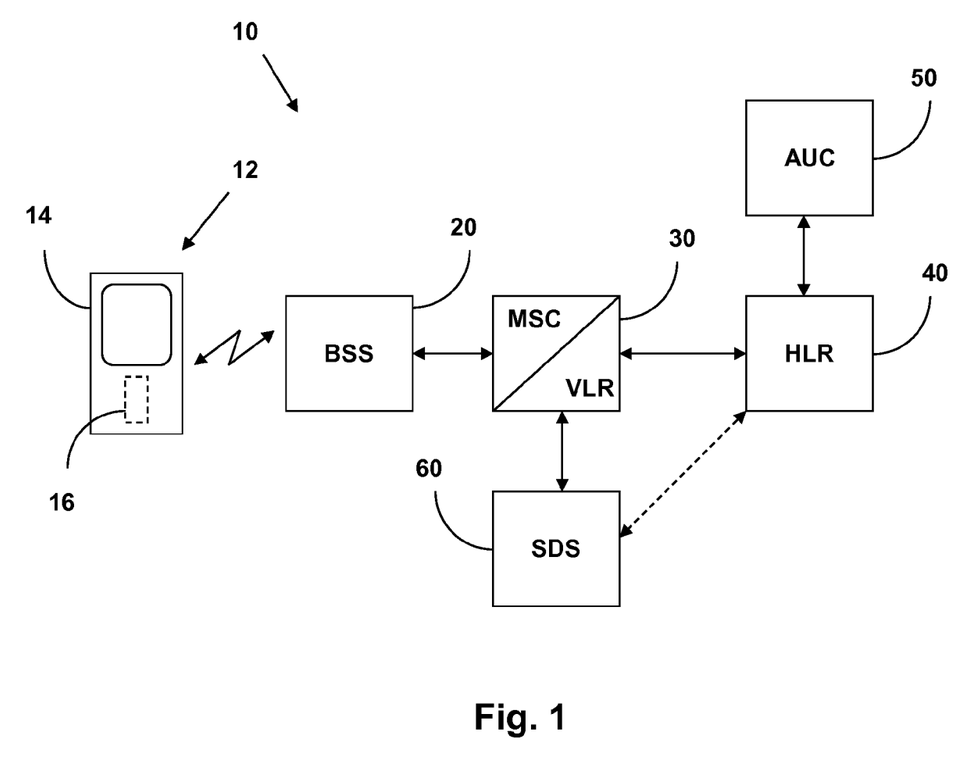
FIG. 1 shows a schematic overview of a mobile communications system incorporating several aspects of the present invention.

FIG. 1 shows schematically the components of a mobile communications system 10 as well as some of the communication channels between the components of this system 10 that illustrates different aspects of the present invention.

The mobile communications system 10 refers generally to any telecommunications system wherein the access point to the system may change when subscribers are moving within the service area of the system. In the following, preferred embodiments of the invention will be described using the terms and elements according to the standards of the Global System for Mobile communication (GSM), as specified in a number of specifications provided by ETSI. However, the person skilled in the art will appreciate that the present invention may be advantageously applied in connection with other mobile communications systems as well. Such systems include third-generation mobile communication systems (3GPP), such as the Universal Mobile Telecommunications System (UMTS), CDMA2000 and the like, as well as other systems based on the above systems, such as GPRS (General Packet Radio Service) and CAMEL (Customised Applications for Mobile network Enhanced Logic).

Moreover, in the following, the preferred embodiments of the invention will be described in the context of providing subscription data to a subscriber identity module (SIM), as the SIM is currently the most popular type of secure identification element used in mobile communications systems for unique and secure identification of the subscribers as well as for the provision of different special functions and value-added services. The person skilled in the art will appreciate, however, that other types of secure identification elements that, depending on the underlying generation and type of system standard, are designated as UICC, USIM, R-UIM or also ISIM, are also encompassed by the present invention.

In FIG. 1, an exemplary mobile station 12 is shown that comprises a mobile terminal 14 and a subscriber identity module (SIM) 16 inserted into the mobile terminal 14. The mobile station 12 communicates via the air interface (or radio link) with a base station subsystem (BSS) 20. As is well known to the person skilled in the art, the base station subsystem 20 generally consists of one or more base transceiver stations that define respective cells of the mobile communications system 10 and are connected to a base station controller. Generally, the base station controller is one of several base station controllers that communicate with a mobile switching center (MSC). Often, a local database called Visitor Location Register (VLR) for keeping track of the mobile users currently located within the cells covered by a MSC (i.e. the MSC service area) is incorporated in the MSC, hereinafter referred to as the MSC/VLR 30.

The MSC/VLR 30 provides essentially the same functionality as a central office switch in a public-switched telephone network (PSTN) and is additionally responsible for call processing, mobility management, and radio resource management. The MSC/VLR 30 is further in communication with a home location register (HLR) 40. The HLR 40 is the primary database in the PLMN provided by the mobile communications system 10 that stores information about mobile users. To this end, the HLR 40 communicates with an authentication center (AUC) 50.

As is known to the person skilled in the art, the communication means between the different components of the mobile communications system 10 may be proprietary or may use open standards. The protocols may be SS7 or IP-based. SS7 is a global standard for telecommunications defined by the International Telecommunication Union (ITU) Telecommunication Standardization Sector (ITU-T). The standard defines the procedures and the protocol by which network elements in the public switched telephone network exchange information over a digital signaling network to effect wireless (cellular) and wireline call setup, routing and control. The SS7 network and protocol are used for e.g. basic call setup, management, wireless services, wireless roaming, and mobile subscriber authentication, i.e. enhanced call features providing for efficient and secure worldwide telecommunications. The physical elements by which the elements are grouped or left separate and the interfaces—whether proprietary or open—are left to the PLMN operator.

Furthermore, the mobile communications system 10 shown in FIG. 1 comprises a unit for providing subscription data, preferably a dedicated subscription data server (SDS; also called OTA server) 60. As schematically shown in FIG. 1, the SDS 60 can be a stand-alone unit that is in communication with the MSC/VLR 30 and optionally the HLR 40 and is configured to provide subscription data to the mobile station 12.

The function of the SDS 60 in combination with the other elements of the mobile communications systems 10 shown in FIG. 1 will now be described under further reference to FIG. 2. In step S1 of FIG. 2 a process of obtaining subscription data is started by means of the mobile station 12 containing the SIM 16, preferably by a user of the mobile station 12 starting a subscription data retrieval application provided on his mobile station 12, such as by using a touch screen and/or a keypad of the mobile equipment 14. Alternatively, the process of obtaining subscription data according to the present invention can be automatically started, when the user starts the mobile station 12 and its SIM 16 for the first time. It is important to note that the process of obtaining subscription data shown by means of steps S1-S6 in FIG. 2 advantageously can be performed OTA before the SIM 16 has successfully attached to or authenticated itself relative to the PLMN provided by the mobile communications system 10, i.e. while the SIM 16 is still in a pre-attach mode.

As a result of the triggering of the subscription data retrieval session, the mobile station 12 forwards a mode indicator data element, preferably in the form of a preliminary IMSI (hereinafter abbreviated as PIMSI) number, that is stored on the SIM 16 via the air interface and the base station subsystem 20 to the MSC/VLR 30 (step S2 of FIG. 2). Preferably, the PIMSI number has the same format as an IMSI number, i.e. the PIMSI number can have up to 15 digits. This has the advantage that the MSC/VLR 30 handles the PIMSI number as a "regular" IMSI number and issues a "Send Authentication Triplets" request according to the MAP protocol on the basis of this PIMSI number. The MSC/VLR 30 forwards the "Send Authentication Triplets" MAP request to the SDS 60 that is addressed by the PIMSI number (step S3 of FIG. 2).

The PIMSI number differs from a "regular" IMSI number only in that some part of the PIMSI number indicates to the unit that receives the PIMSI number from the MSC/VLR 30 that the SIM 16 is not in a mode to perform a conventional GSM attachment/authentication procedure, but rather is in a (preferably pre-attach) subscription data retrieval mode. Consequently, it is possible that, as in the case of the IMSI number, the first 3 digits of the PIMSI number represent the Mobile Country Code and the next 2 or 3 digits of the PIMSI number represent the Mobile Network Code. This would have the advantage that, for instance, the operator of a PLMN (being uniquely defined by a certain mobile country code and a certain mobile network code) could reserve one or more unassigned mobile station identification numbers (i.e. the remaining digits of the PIMSI number) as indicators that the SIM 16 is in a subscription data retrieval mode requesting subscription data. Alternatively, the PIMSI number could have a Mobile Country Code and/or a Mobile Network Code that has not been allocated by the International Telecommunication Union yet, i.e. a globally roaming enabled range of unassigned IMSI numbers. It is important to note that contrary to an IMSI number the PIMSI number contained on a SIM 16 with incomplete subscription data does not have to be unique, i.e. according to the present invention several SIMs can be provided with the same PIMSI number for obtaining (missing) subscription data.

According to the present invention it is possible that the PIMSI number is essentially the only subscription data that is present on the SIM 16 initially (i.e. prior to the initial start-up). For instance, the PIMSI number can be stored on the SIM 16 during the manufacturing or personalization process of the SIM 16. All the other (missing) subscription data, e.g. for performing the standard GSM challenge-response attachment/authentication procedure, can be provided to the SIM 16 by means of the present invention.

In response to the MAP request of the MSC/VLR 30 to provide an authentication triplet the SDS 60 creates such an authentication triplet. However, contrary to what happens in a conventional HLR/AUC during the standard GSM challenge-response authentication procedure, the SDS 60 will not create a RAND number being a 128-bit random number, but rather a RAND* number having the same format, i.e. also with a size of 128 bits, wherein at least some of the bits of the RAND* number comprise subscription data (step S4 of FIG. 2). In other words, the SDS 60 packages or embeds subscription data into the RAND* number having the same format as the RAND number used in the conventional GSM authentication procedure. That is, the RAND* number is an OTA carrier for the subscription data. As only the RAND* number will be finally forwarded from the MSC/VLR 30 to the mobile station 12 by means of a DTAP Authentication Request, the values for the signed response and the ciphering key can be chosen arbitrarily, as long as the format of these data elements complies with the format defined by the standard GSM challenge-response authentication procedure and allows for a seamless conversion of the MAP message sent from the SDS 60 to the MSC/VLR 30 to the DTAP request sent from the MSC/VLR 30 to the mobile station 12.

As already mentioned above, according to the present invention it is, in principle, conceivable that the PIMSI number is the only subscription data that is present on the SIM 16 initially. Preferably, the subscription data provided by the SDS 60 in the form of a RAND* number includes an IMSI that enables the SIM 16 to perform the standard GSM challenge-response authentication procedure and to authenticate itself relative to the PLMN provided by the mobile communications system 10. Additionally or alternatively, the subscription data provided by the SDS 60 in the form of a RAND* number includes an authentication key Ki to be used during the standard GSM challenge-response authentication procedure. Moreover, the subscription data provided by the SDS 60 in the form of a RAND* number can include instructions to perform certain actions, such as "retry data retrieval in 60 seconds", "use a different data providing unit" and the like.

The SDS 60 can be configured to send the subscription data carried by the RAND* number as plaintext. This variant can be used for subscription data that is not critical from a security perspective. According to another variant, the SDS 60 can send merely a pointer or index to a specific element of a list, such as a list of different instruction sets or a list of pairs of IMSI numbers and authentication keys Ki, or to a complete subscription profile from a list of available subscription profiles pre-stored on the SIM 16. As these pairs of IMSI numbers and authentication keys Ki are preferably also stored in the AUC 50, it is possible for the AUC 50, once it has received the same information (i.e. the pointer or index) from the SDS 60 (possibly via the HLR 40), to assign an authentication key Ki to the IMSI number received from the SIM 16 in the course of the standard GSM challenge-response authentication procedure.

According to another variant, the SDS 60 can be additionally or alternatively configured to encrypt the subscription data carried by the RAND* number by means of an encryption key stored on the SDS 60. For extracting the encrypted subscription data from the RAND* number received by the SIM 16 this encryption key also has to be present on the SIM 16. The SDS 60 can also be configured to send the subscription data as a RAND* number, wherein the subscription data is a function of the RAND* number and a master key stored on the SDS 60 and the SIM 16. For instance, the authentication key Ki could be extracted from the subscription data by feeding the RAND* number sent by the SDS 60 and the master key stored on the SIM 16 into the appropriate encryption algorithm.

In addition to the above, the person skilled in the art will be aware of many other mechanisms that allow for a secure transmission of subscription data from the SDS 60 to the SIM 16 and optionally to the HLR 40 and/or the AUC 50. All of these mechanisms can be employed according to the present invention, preferably as long as it is ensured that the information or data that is required for the SIM 16 to perform a standard GSM challenge-response attachment/authentication procedure is communicated in a secure fashion to the SIM 16 and, if necessary, to the HLR 40 and/or AUC 50.

Figure 2:
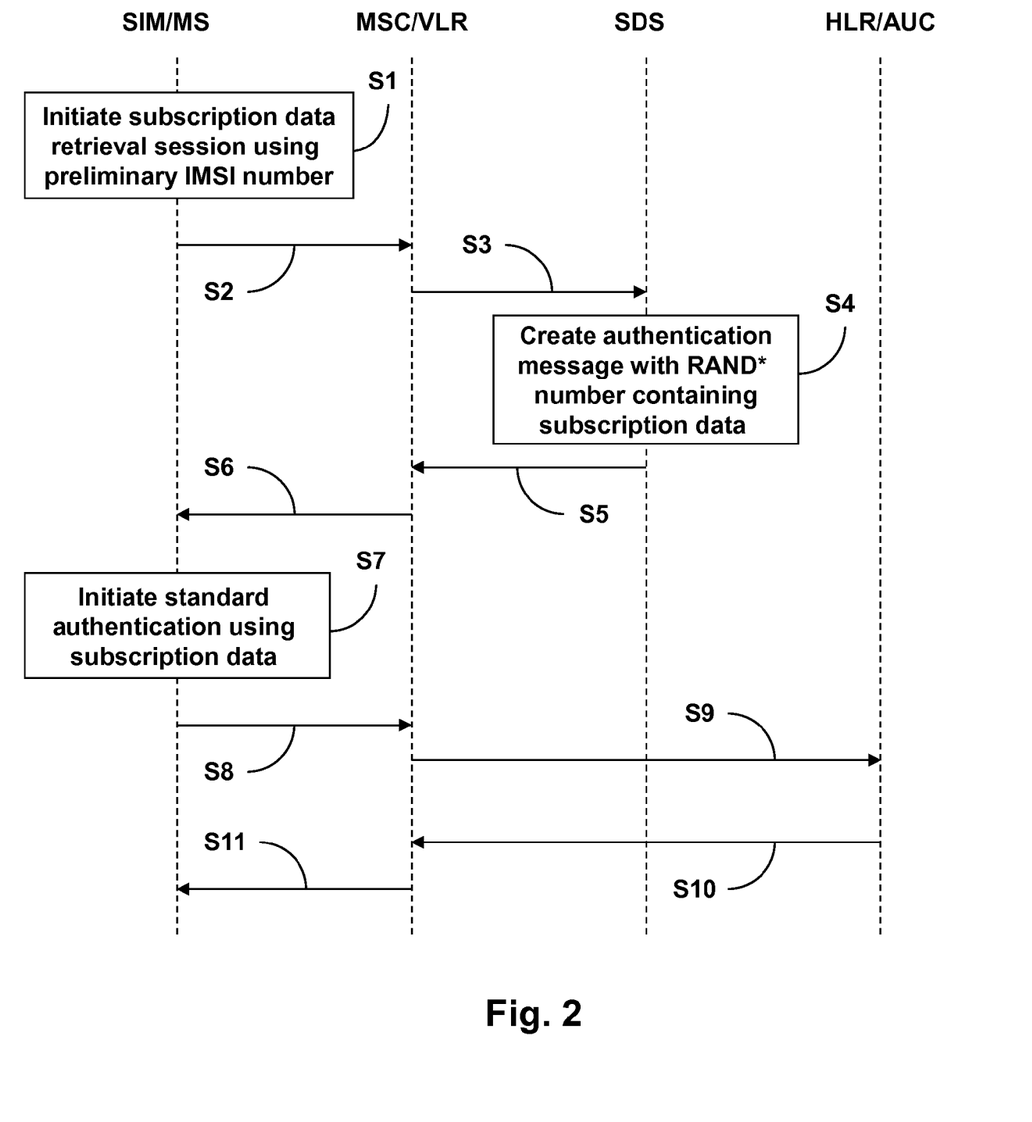
FIG. 2 shows a signal diagram illustrating a method for providing a subscriber identity module with subscription data according to aspects of the present invention.

Once the SDS 60 has created an authentication triplet in the manner as described above, it will, like a conventional HLR during the standard GSM challenge-response attachment procedure, forward a "Send Authentication Triplets Acknowledgement" message according to the MAP protocol to the MSC/VLR 30 including subscription data "disguised" as or carried by a RAND* number (step S5 of FIG. 2). As the MSC/VLR 30 considers the SIM 16 to have requested authentication according to the standard GSM challenge-response authentication procedure by means of its PIMSI, the MSC/VLR 30 transparently forwards the RAND* number carrying the subscription data provided by the SDS 60 via the base station subsystem 20 and the air interface OTA to the mobile station 12 and its SIM 16 by means of a DTAP Authentication Request (step S6 of FIG. 2).

As the SIM 16 has originally initiated the retrieval of subscription data (step 1 of FIG. 2), it is still in a (preferably pre-attach) subscription data retrieval mode and considers the RAND* number received in step 6 of FIG. 2 from the SDS 60 to contain subscription data (possibly including instruction data). As described above, the subscription data carried by the RAND* number can be in plaintext, encrypted or simply a pointer. Once the SIM 16 has extracted the subscription data from the RAND* number, the extracted data is stored in a non-volatile memory of the SIM 16 for further use and any instructions contained therein can be executed.

In case the volume or size of the subscription data to be sent from the SDS 60 to the mobile station 12 is larger than the size of the challenge, e.g. 128 bits in the case of the RAND* number of the standard GSM challenge-response authentication procedure, the method shown in FIG. 2 can be repeated as often as required to communicate subscription data carried by several challenges, e.g. several RAND* numbers.

Figure 3:
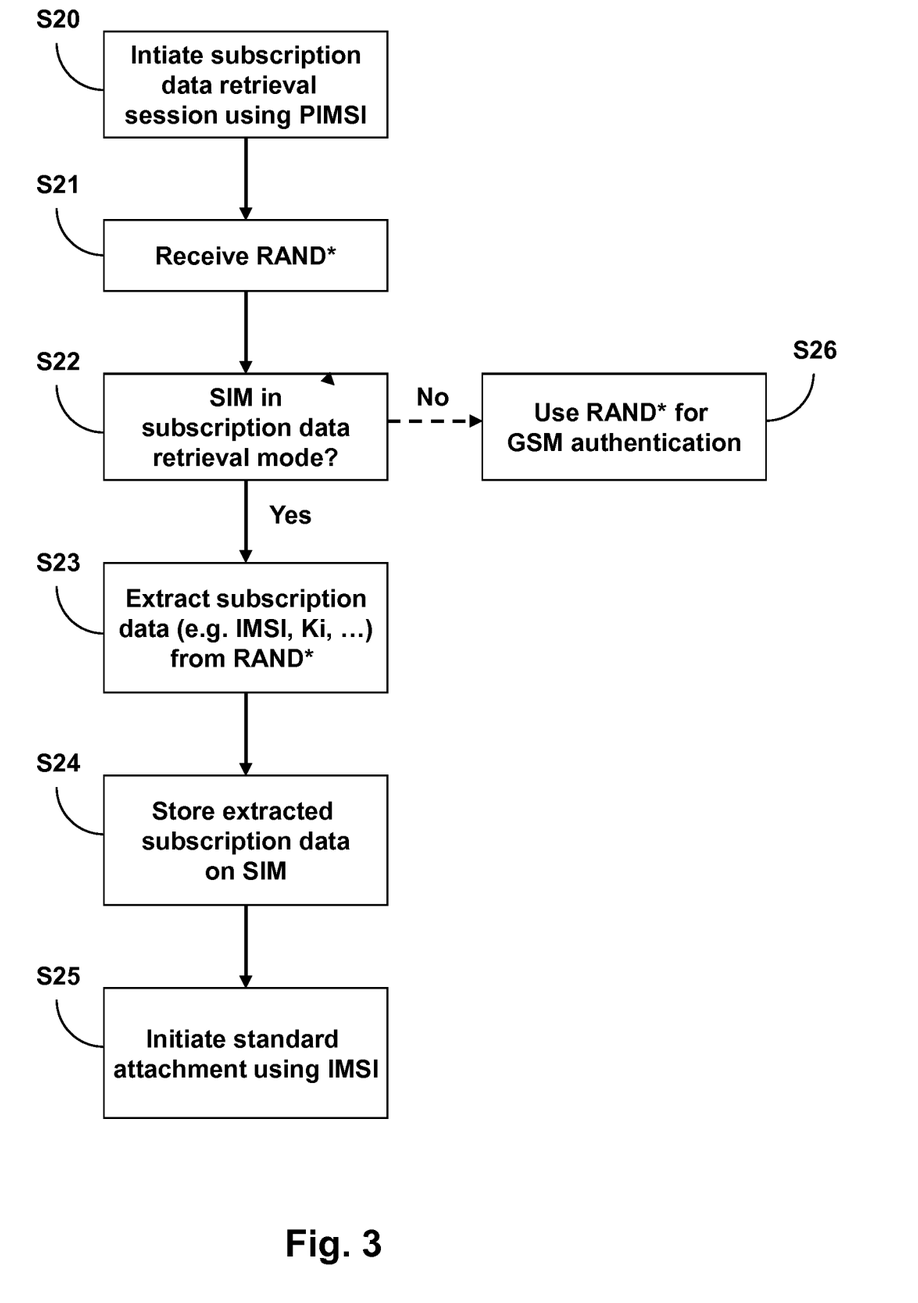
FIG. 3 shows a flow diagram illustrating the operation of an application running on the subscriber identity module of a mobile station according to aspects of the present invention.

According to a preferred embodiment of the present invention, an application is running on the SIM 16 that handles the received RAND* number differently, depending on whether the SIM 16 is in the (preferably pre-attach) subscription data retrieval mode or the "normal" mode ready for authentication according to the standard GSM challenge-response authentication procedure. The preferred operation of this application running on the SIM 16 is illustrated in FIG. 3.

The application running on the SIM 16 is preferably started manually by a user of the mobile station 12 or automatically, when the mobile station 12 and the SIM 16 are started up for the first time. The application starts the subscription data retrieval session by sending the PIMSI number stored on the SIM 16 to the PLMN provided by the mobile communications system 10 (step S20 of the method shown in FIG. 3). In step S21 of the method shown in FIG. 3 the SIM 16 receives the RAND* number from the SDS 60 (via the MSC/VLR 30) and passes it to the application running on the SIM 16. The application determines whether the SIM 16 is either in the subscription data retrieval mode or in the normal mode (step S22 of the method shown FIG. 3). In case the application running on the SIM 16 determines the SIM 16 to be in the subscription data retrieval mode, the application will try to extract the subscription data from the RAND* number sent by the SDS 60 (step S23 of the method shown in FIG. 3) and store the extracted data on the SIM 16 (step S24 of the method shown in FIG. 3) and possibly perform any instructions contained therein. Thereafter, the application running on the SIM 16 switches from subscription data retrieval mode to normal mode and initiates the standard GSM challenge-response attachment procedure possibly using a new IMSI number that was provided by the SDS 60 by means of the RAND* number (step S25 of the method shown in FIG. 3). If in step S22 of the method shown in FIG. 3 the application running on the SIM 16 determines the SIM 16 to be in the normal mode, the RAND* number can optionally be passed on to the standard GSM authentication algorithm running on the SIM 16 (step S26 of the method shown in FIG. 3). According to a preferred embodiment, any failures during the above described subscription data retrieval session can re-initialize the SIM 16 and the application running thereon to the subscription data retrieval mode. Although the steps shown in FIG. 3 have been described in the context of an application running on the SIM 16, the person skilled in the art will appreciate that the same steps could be implemented by means of an application running on the mobile equipment 14 or two interacting applications running on the SIM 16 and the mobile equipment 14, respectively.

As already described above, once the SIM 16 has received and preferably stored the subscription data provided by the SDS 60 in the form of a RAND* number, it can switch to the regular mode and initiate the standard GSM challenge-response authentication/attachment procedure using the subscription data provided by the SDS 60 (step S7 of FIG. 2) by sending its (possibly new) IMSI number to the MSC/VLR 30 (step S8 of FIG. 2). From this point on, the SIM 16 behaves like a regular SIM that had been provided with the subscription data obtained from the SDS 60 in the first place, such as during the manufacturing and/or personalization process thereof.

In step S9 of FIG. 2 the MSC/VLR 30 forwards the IMSI number to the HLR 40 and requests verification of the IMSI number. The HLR 40 forwards the IMSI number to the AUC 50 and requests authentication triplets. As already described in the background section of the present invention, for generating an authentication triplet, i.e. a Signed Response (SRES), a "regular" 128-bit random number RAND and a ciphering key Kc, the AUC 50 needs to know the IMSI number and the associated authentication key Ki, which must be identical to the authentication key Ki that is securely stored on the SIM 16. As described above, this information is available to the AUC 50, because preferably the SDS 60 has informed the AUC 50 (possibly via the HLR 40) during the pre-attach procedure about the authentication key Ki that is assigned to the IMSI number provided to the SIM 16.

The AUC 50 sends the authentication triplet along with the IMSI number back to the HLR 40. The HLR 40 validates the IMSI number and then forwards the IMSI number and the authentication triplet back to the MSC/VLR 30 (step S10 of FIG. 2). The MSC/VLR 30 stores the SRES and the ciphering key Kc and forwards the RAND number to the BSS 20 and orders the BSS 20 to authenticate the mobile station 12. The BSS 20 sends an Authentication Request message to the mobile station 12, the RAND number being the only parameter being sent to the mobile station 12. The mobile station 12 uses the RAND number to calculate another Signed Response (SRES*) on the basis of the same algorithm as used by the AUC 50 to compute the SRES and sends the SRES* back to the BSS 20, which forwards the SRES* to the MSC/VLR 30. The MSC/VLR 30 compares the SRES generated by the AUC 50 with the SRES* generated by the mobile station 12. If the two numbers match the SIM 16 is authenticated and the mobile station 12 is granted access to the PLMN provided by the mobile communications systems 10 and its services. The ciphering key Kc is used to encrypt all further communications between the mobile station 12 and the PLMN. As will be appreciated by the person skilled in the art, the final steps of the above described standard GSM challenge-response authentication procedure have been summarized as step S11 in FIG. 2. It should be noted that the above described steps S8 to S11 do not involve the SDS 60. In other words, the SDS 60 is preferably transparent with respect to the standard GSM challenge-response authentication/attachment procedure.

Figure 4:
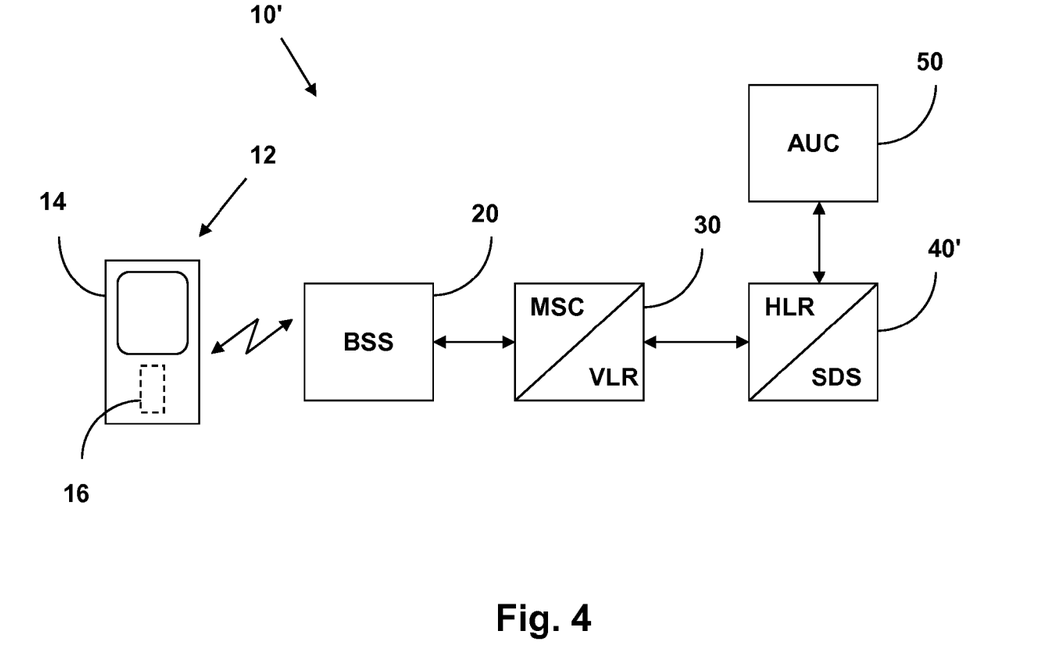
FIG. 4 shows a schematic overview of a further mobile communications system incorporating aspects of the present invention.

FIG. 4 shows schematically the components of a further mobile communications system 10' that is a variant of the mobile communications system 10 shown in FIG. 1. The mobile communications system 10' shown in FIG. 4 differs from the mobile communications system 10 shown in FIG. 1 in that in the mobile communications system 10' the subscription data server has been implemented together with the HLR as a single unit, namely the HLR/SDS 40'. According to preferred embodiments, the SDS can be implemented in a HLR by additional hardware and/or by software, e.g. as a virtual SDS. Providing a virtual SDS as part of the HLR would have the advantage that essentially no hardware modifications would be necessary to implement the present invention in the existing hardware infrastructure of a conventional GSM PLMN.

The configuration of the HLR and the SDS as a single unit 40' has the advantage over the configuration shown in FIG. 1, where the HLR 40 and the SDS 60 are separate units connected via a suitable external communication channel, that no critical information about the subscription data that the SDS 60 has sent to the SIM 16 in the form of the RAND* number has to be communicated along the external communication channel between the SDS and the HLR and/or the AUC. Obviously, the HLR/SDS 40' has to be suitably configured to be able to distinguish between an IMSI number requesting an authentication triplet containing a regular RAND number and a PIMSI number requesting an authentication triplet with a RAND* number containing subscription data. It is also conceivable that in further variants the SDS is integrated as part of the AUC or as part of an implementation of the HLR and the AUC within a single unit.

According to a preferred embodiment, information about the subscription data retrieval session, e.g. the location of the SIM 16 as defined by the Location Area Identity (LAI), can be used by the SIM 16 and/or the SDS 60, HLR/SDS 40' to select the subscription data most suitable for the SIM 16 from several subscription data options. Alternatively or additionally, the device type, which could be encoded in the PIMSI, can influence the selection of a subscription profile and/or a set of instructions.

Although it has been described above that the present invention advantageously can be employed before the SIM 16 has successfully attached to or authenticated itself relative to the PLMN provided by the mobile communications systems 10 or 10', the person skilled in the art will appreciate that the present invention can also be employed after the SIM 16 has attached to the PLMN. According to the present invention it is conceivable that a SIM 16 contains both a "regular" IMSI number as well as a PIMSI number, as described above. In this case, an application running on the SIM 16 and/or the mobile equipment 14 could allow a user to select either attaching to the PLMN using the "regular" IMSI number or requesting subscription data using the PIMSI number.

Moreover, as the person skilled in the art will appreciate, the present invention can also be advantageously combined with other OTA management methods of a SIM that work only after the SIM has authenticated itself relative to a PLMN. For instance, in a first phase of a subscription data retrieval process the SIM could by means of the present invention obtain essentially only those subscription data that are necessary for a successful authentication relative to a PLMN, in particular an IMSI number and/or an authentication key Ki. After the authentication of the SIM relative to the PLMN, i.e. the attachment of the SIM to the PLMN, on the basis of these essential subscription data, the SIM could obtain further subscription data using, for instance, the ODA (On Demand Activation) application described in WO 2010/093312.

According to the present invention it is also possible that more than one subscription data providing unit is involved in the pre-attach process of obtaining subscription data. For instance, the SIM could by means of a first PIMSI initially stored on the SIM request subscription data from a first subscription data providing unit. In response, the first subscription data providing unit could provide a first set of subscription data including a second PIMSI referring to a second subscription data providing unit. Then, the SIM could request additional subscription data from the second subscription data providing unit by means of the second PIMSI provided by the first subscription data providing unit as part of the first set of subscription data. Such a configuration could be realised, for instance, by a combination of the above described first and second preferred embodiments, i.e. a mobile communications system having a first subscription data server (SDS) 60 as well as a unit 40' combining the functions of the HLR and a second SDS.

One of many possible scenarios where the present invention can be advantageously employed is the following one. Often the products of an original equipment manufacturer (OEM) producing, for instance, consumer electronics products that are configured to communicate via a mobile communications network will be sold by an operator of such a mobile communications network. In this case, the expertise about the products and their technical features will be on the side of the OEM, whereas the network operator will have detailed information about the mobile network. Therefore, using the present invention it could be advantageous to allow an OEM to operate a first phase of providing subscription data and a network operator to operate a subsequent second phase of providing subscription data. In such a scenario the first pre-attach process will be directed to a first SDS operated by the OEM, which will provide the SIM of a product, for instance, with a new PIMSI that is configured to obtain further subscription data from a second SDS operated by the network operator. In doing so, the OEM, i.e. the initial attach operator, can be kept unaware of sensitive subscription details in the SIM (e.g. the authentication key Ki) only known to the network operator. In addition, another SDS could be operated by the manufacturer of the SIM.

The present invention has been described in the context of some advantageous embodiments implemented in a GSM network. However, this is not to be understood to restrict the invention to the details of these embodiments, which are presented for illustrative purposes only, as the general idea of the present invention could equally be implemented in mobile communications systems other than GSM that employ a challenge-response procedure for authenticating a subscriber. Moreover, in light of the above detailed description the person skilled in the art will appreciate that modifications and/or additions can be made to the methods and devices as described heretofore, which are to be considered to remain within the scope of the present invention as defined by the appended claims.

The invention claimed is:

1. A method for providing subscription data from a data providing unit to a secure identification element of a mobile station for communication via a mobile communications system, wherein the mobile communications system implements a challenge-response authentication procedure to authenticate mobile stations therewith, and wherein the method comprises the following steps performed by the data providing unit:

receiving a request from the mobile station to start the challenge-response authentication procedure implemented in the mobile communications system, wherein the request contains a mode indicator data element signifying that a modified challenge-response authentication procedure be used to provide subscription data to the mobile station instead of authenticating the mobile station, wherein the mode indicator data element causes the mobile communications system to forward the request to the data providing unit and informs the data providing unit that the mobile station is requesting subscription data, and wherein the mode indicator data element comprises a preliminary IMSI (PIMSI) number that defines the address of the data providing unit and has the same format as an IMSI number;

creating a challenge containing subscription data, wherein the format of the challenge conforms to the format of the challenge portion of the challenge-response authentication procedure implemented in the mobile communications system, wherein the challenge comprises a modified random number RAND* that carries the subscription data, and wherein the subscription data carried by the challenge comprises an IMSI number and an authentication key Ki; and transmitting the challenge containing the subscription data to the mobile station, wherein the subscription data is extracted from the challenge and is usable by the mobile station to authenticate itself with the mobile communications system in a subsequent standard challenge-response authentication procedure of the mobile communications system.

2. The method of claim 1, wherein the data providing unit comprises a dedicated subscription data providing server or part of a home location register of the mobile communications system, wherein the secure identification element comprises a subscriber identity module of the mobile station, and wherein the PIMSI number was stored on the subscriber identity module during a previous manufacturing or personalization process.

3. The method of claim 1, wherein the steps of the method are performed over-the-air before the mobile station has attached to the mobile communications system.

4. The method of claim 1, wherein the subscription data carried by the challenge is in plaintext or is encrypted, and wherein the secure identification element of the mobile station stores an encryption key for extracting the subscription data from RAND* if encrypted.

5. The method of claim 1, wherein the steps of the method are repeated as often as necessary, in case the size of the subscription data is larger than the size of the challenge.

6. The method of claim 1, wherein the selection of the subscription data carried by the challenge depends upon the location of the mobile station and/or the type of the mobile equipment of the mobile station.

7. The method of claim 1, wherein the mobile communications system is implemented according to the GSM standard, and wherein the challenge is created as part of an authentication triplet that further comprises a signed response SRES and a ciphering key Kc according to the GSM challenge-response authentication procedure.

8. A method for obtaining subscription data from a data providing unit by a secure identification element of a mobile station for communication via a mobile communications system, wherein the mobile communications system implements a challenge-response authentication procedure to authenticate mobile stations therewith, and wherein the method comprises the following steps performed by the secure identification element:

providing a mode indicator data element to a mobile equipment of the mobile station, wherein the mobile equipment issues the mode indicator data element as part of a request to start the challenge-response authentication procedure implemented in the mobile communications system, wherein the mode indicator data element signifies that a modified challenge-response authentication procedure be used to provide subscription data to the mobile station instead of authenticating the mobile station, wherein the mode indicator data element causes the mobile communications system to forward the request to the data providing unit and informs the data providing unit that the mobile station is requesting subscription data, and wherein the mode indicator data element comprises a preliminary IMSI (PIMSI) number that defines the address of the data providing unit and has the same format as an IMSI number;

receiving a challenge containing subscription data issued by the data providing unit, wherein the format of the challenge conforms to the format of the challenge portion of the challenge-response authentication procedure implemented in the mobile communications system, wherein the challenge comprises a modified random number RAND* that carries the subscription data, and wherein the subscription data carried by the challenge comprises an IMSI number and an authentication key Ki; and storing the subscription data received in the challenge, wherein the subscription data is extracted from the challenge and is usable by the mobile station to authenticate itself with the mobile communications system in a subsequent standard challenge-response authentication procedure of the mobile communications system.

9. A data providing unit that provides a secure identification element of a mobile station with subscription data for communication via a mobile communications system, wherein the mobile communications system implements a challenge-response authentication procedure to authenticate mobile stations therewith, and wherein the data providing unit is configured to:

receive a request from the mobile station to start the challenge-response authentication procedure implemented in the mobile communications system, wherein the request contains a mode indicator data element signifying that a modified challenge-response authentication procedure be used to provide subscription data to the mobile station instead of authenticating the mobile station, wherein the mode indicator data element causes the mobile communications system to forward the request to the data providing unit and informs the data providing unit that the mobile station is requesting subscription data, and wherein the mode indicator data element comprises a preliminary IMSI (PIMSI) number that defines the address of the data providing unit and has the same format as an IMSI number;

create a challenge containing subscription data, wherein the format of the challenge conforms to the format of the challenge portion of the challenge-response authentication procedure implemented in the mobile communications system, wherein the challenge comprises a modified random number RAND* that carries the subscription data, and wherein the subscription data carried by the challenge comprises an IMSI number and an authentication key Ki; and transmit the challenge containing the subscription data to the mobile station, wherein the subscription data is extracted from the challenge and is usable by the mobile station to authenticate itself with the mobile communications system in a subsequent standard challenge-response authentication procedure of the mobile communications system.

10. The data providing unit of claim 9, wherein the data providing unit comprises a dedicated subscription data providing server or part of a home location register of the mobile communications system, wherein the secure identification element comprises a subscriber identity module of the mobile station, and wherein the PIMSI number was stored on the subscriber identity module during a previous manufacturing or personalization process.

11. A secure identification element of a mobile station that obtains from a data providing unit subscription data for communication via a mobile communications system, wherein the mobile communications system implements a challenge-response authentication procedure to authenticate mobile stations therewith, and wherein the secure identification element is configured to:

provide a mode indicator data element to a mobile equipment of the mobile station, wherein the mobile equipment issues the mode indicator data element as part of a request to start the challenge-response authentication procedure implemented in the mobile communications system, wherein the mode indicator data element signifies that a modified challenge-response authentication procedure be used to provide subscription data to the mobile station instead of authenticating the mobile station, wherein the mode indicator data element causes the mobile communications system to forward the request to the data providing unit and informs the data providing unit that the mobile station is requesting subscription data, and wherein the mode indicator data element comprises a preliminary IMSI (PIMSI) number that defines the address of the data providing unit and has the same format as an IMSI number;

receive a challenge containing subscription data issued by a data providing unit, wherein the format of the challenge conforms to the format of the challenge portion of the challenge-response authentication procedure implemented in the mobile communications system, and wherein the challenge comprises a modified random number RAND* that carries the subscription data, and wherein the subscription data carried by the challenge comprises an IMSI number and an authentication key Ki; and store the subscription data received in the challenge, wherein the subscription data is extracted from the challenge and is usable by the mobile station to authenticate itself with the mobile communications system in a subsequent standard challenge-response authentication procedure of the mobile communications system.

12. The secure identification element of claim 11, wherein the data providing unit comprises a dedicated subscription data providing server or part of a home location register of the mobile communications system, wherein the secure identification element comprises a subscriber identity module of the mobile station, and wherein the PIMSI number was stored on the subscriber identity module during a previous manufacturing or personalization process.

13. A mobile communications system comprising a data providing unit that provides subscription data according to claim 9.

14. The mobile communications system of claim 13, further comprising a mobile station with a secure identification element comprising a subscriber identity module that obtains subscription data according to claim 11.

15. The mobile communications system of claim 14, wherein the data providing unit comprises a dedicated subscription data providing server or part of a home location register of the mobile communications system, wherein the secure identification element comprises a subscriber identity module of the mobile station, and wherein the PIMSI number was stored on the subscriber identity module during a previous manufacturing or personalization process.

* * * * *